(12) United States Patent
Keese et al.

(10) Patent No.: US 7,720,625 B2
(45) Date of Patent: May 18, 2010

(54) METHOD OF TESTING THE INSTALLATION OF A MEASURING DEVICE

(75) Inventors: Dieter Keese, Wahlsburg (DE); Harry Plotzki, Göttingen (DE); Frank Buhl, Rosdorf (DE); Karl-Heinz Rackebrandt, Adelebsen (DE); Andreas Thöne, Nörten-Hardenberg (DE); Jörg Herwig, Kandern (DE); Rolf Merte, Heidelberg (DE); Peter Riegler, Göttingen (DE)

(73) Assignee: ABB Patent GmbH, Ladenburg (DE)

( * ) Notice: Subject to any disclaimer, the term of this patent is extended or adjusted under 35 U.S.C. 154(b) by 568 days.

(21) Appl. No.: 11/630,928

(22) PCT Filed: Jun. 30, 2005

(86) PCT No.: PCT/EP2005/007035

§ 371 (c)(1),
(2), (4) Date: Dec. 27, 2006

(87) PCT Pub. No.: WO2006/002910

PCT Pub. Date: Jan. 12, 2006

(65) Prior Publication Data

US 2008/0027660 A1 Jan. 31, 2008

(30) Foreign Application Priority Data

Jun. 30, 2004 (DE) .................. 10 2004 031 637

(51) Int. Cl.
*G01F 25/00* (2006.01)
*G06F 17/40* (2006.01)

(52) U.S. Cl. .................. 702/116; 702/45; 73/1.16; 73/1.59; 73/861.356

(58) Field of Classification Search ................ 702/116, 702/45
See application file for complete search history.

(56) References Cited

U.S. PATENT DOCUMENTS

| 5,347,873 | A | * | 9/1994 | Vander Heyden | ......... 73/861.22 |
| 5,842,157 | A | * | 11/1998 | Wehhofer et al. | ........... 702/189 |
| 5,926,096 | A | * | 7/1999 | Mattar et al. | ................. 340/606 |
| 7,298,281 | B2 | * | 11/2007 | Cupples et al. | ............. 340/612 |
| 7,505,861 | B2 | * | 3/2009 | Buhl et al. | .................. 702/116 |
| 2006/0095223 | A1 | * | 5/2006 | Gordon et al. | .............. 702/116 |
| 2006/0123922 | A1 | * | 6/2006 | Froehlich et al. | ......... 73/861.29 |

* cited by examiner

*Primary Examiner*—Hal D Wachsman
(74) *Attorney, Agent, or Firm*—Michael M. Rickin; Michael C. Prewitt

(57) ABSTRACT

The invention relates to a method for operating a measuring device, especially a flowmeter. The aim of the invention is to simplify inspection if the sensors have been correctly installed. For this purpose, the installation state is detected by the sensors themselves, i.e. by sensing a corresponding sensor value and comparing it with characteristic data. The result of comparison is electronically evaluated and automatically estimated whether the characteristic data obtained match the comparative data within at least a defined tolerance.

1 Claim, 1 Drawing Sheet

METHOD OF TESTING THE INSTALLATION OF A MEASURING DEVICE

CROSS-REFERENCE TO RELATED APPLICATION(S)

This application claims priority under 35 U.S.C 371 to PCT application number PCT/EP05/07035 filed on Jun. 30, 2005, which claims priority to German application No. 10-2004-031637.6 filed on Jun. 30, 2004.

BACKGROUND OF THE INVENTION

The invention relates to a method for operating a measuring device, especially a flowmeter.

Measuring devices in general are provided with sensors which are arranged within a metering device and, via an appropriate physical effect, determine the measuring effect which they utilize in a causal manner. During the fabrication of measuring devices, it is basically a matter that the sensors are arranged within the measuring device at the points predetermined by the design. It is still possible to indicate tolerances in the positioning of the sensors. However, the sensors have to be arranged and fixed physically within the tolerances. Usually, following the mounting of measuring devices, the same are checked in a test run, so that a satisfactory function can be ensured. Such a test run, which then relates only to the verification of the correct installation of the sensors, is time-consuming.

SUMMARY OF THE INVENTION

The invention is therefore based on the object of developing a method of the generic type to the effect that the checking of the correct installation position of the sensors is simplified.

In this case, the nub of the invention is that the installation state is generated by the sensors themselves, that is to say by sensing an appropriate sensor value, and is compared with characteristic data. The result of the comparison is then evaluated electronically and an automatic estimation is made as to whether the currently obtained characteristic data agrees with the comparative data, at least within a given tolerance.

In this case, at the end either a signal is given which indicates a proper installed state or else, if appropriate, a warning message, so that the respective sensor installation can then be checked specifically.

In a further refinement, it is specified that the characteristic data is stored in a database.

In a further refinement, it is specified that the characteristic data is stored as spectra or variables derived therefrom, which are then compared.

BRIEF DESCRIPTION OF THE DRAWING

The invention is illustrated schematically in FIG. 1.

DETAILED DESCRIPTION OF THE INVENTION

Figure 1:
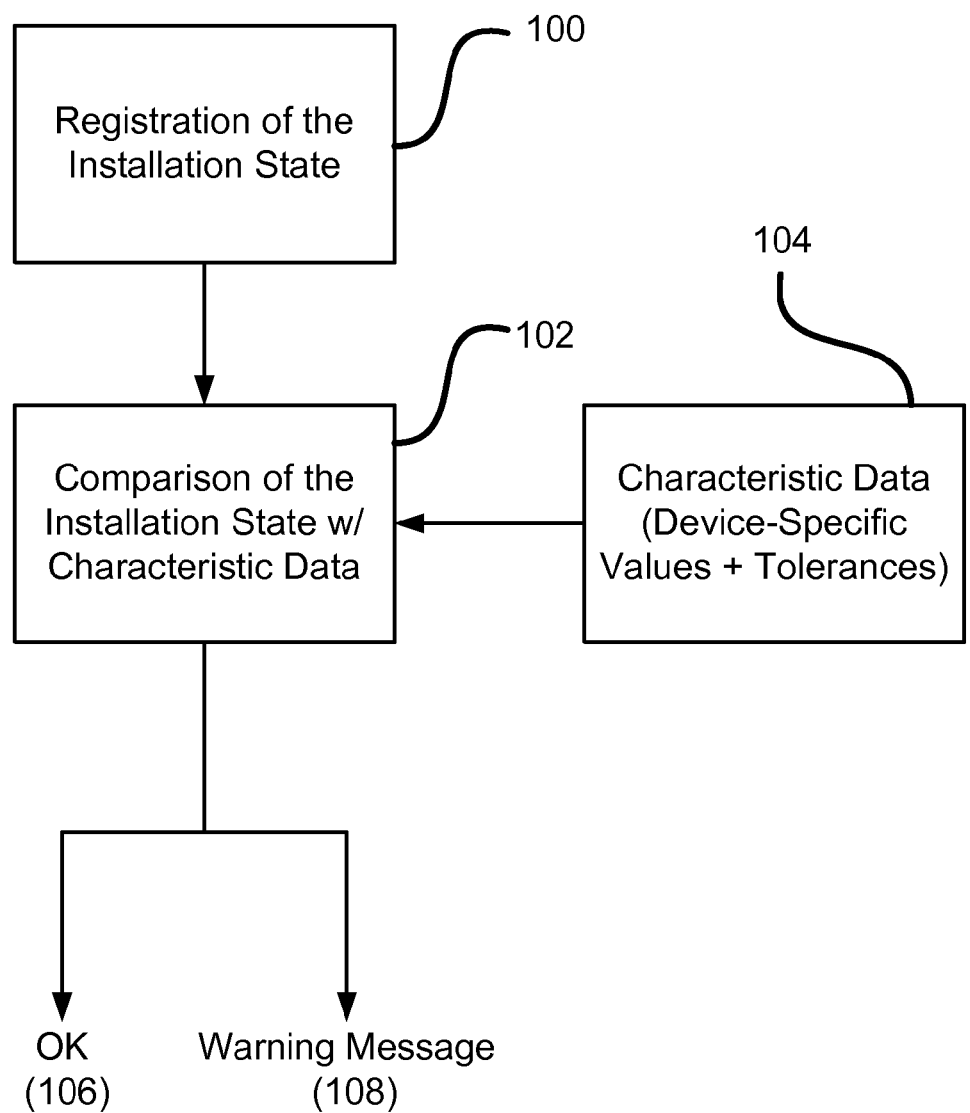

The problem solved by the invention is the elimination or reduction in the impairment of the functionality of sensors on measuring devices as a function of the installation conditions, in which the aforesaid measuring instrument or field instrument, following installation, carries out a self-test, as it is known. In this test, the presence of disadvantageous installation conditions is detected. Via a suitable communications interface, for example a display on the field instrument, the presence and the type of the deficiency is reported. According to the drawing, therefore, firstly at 100 the registration of the installation state is carried out by the sensor itself. Then, at 102 the sensor values obtained in this way are compared with characteristic data from a database 104 and the values and parameters of the installation state and, at the end, either an OK 106 or a warning message 108 is given. The database contains characteristic data which is device-specific, which corresponds to normal values and tolerances.

In this connection, there are two exemplary embodiments, which can also be carried out separately in detail.

A first example relates to a vortex flowmeter. The measured signal in this case depends characteristically, inter alia, on the installation conditions. In suitable series of trials, signal signatures, what are known as "fingerprints", can be recorded under specific installation conditions. Following its installation, the measuring instrument compares its current measured signal with these signatures.

If the measured signal coincides with a fingerprint within limits, the measuring instrument gives an appropriate warning message. Signal signatures can be obtained, for example, from spectra or variables derived therefrom, from characteristic variables from time series, for example by means of chaos theory methods, or from statistical variables. In the case of applying the method according to the invention to a mass flowmeter in accordance with the coriolis principle, the following procedure is specified. Immediately after the installation, that is to say during the self-test proposed here, the device is filled with air.

For this state, the resonant frequency of the instrument in the case of an ideal installation is known. For example, determined during the factory calibration. Installation conditions in which there are distortions lead to a change in the resonant frequency. Via a deviation in the resonant frequency, it is possible to draw conclusions about a distortion impairing the functionality. Furthermore, coriolis mass flowmeters are known which react in an extremely sensitive manner to asymmetries. If, during the self-test, the measured phase difference differs from zero within tolerances, it is possible to conclude that asymmetries are present.

In this case, the self-generation of the self-test is important but is not applied to the functionality and the serviceability of the sensor itself but to its installation position, and whether the latter corresponds to the predefined installation position.

The invention claimed is:

1. A method of operating a coriolis flow meter having a sensor, the method comprising:
   after installation, filling said coriolis flow meter with air;
   recording one or more sensor values from said sensor, said sensor values correlating to a resonant frequency of said coriolis flow meter;
   comparing said one or more sensor values to an ideal sensor installation data, said ideal sensor installation data being the resonant frequency of said coriolis flow meter determined during a factory calibration; and
   alerting an installer if said one or more sensor values differs from said ideal sensor installation data by more than a predetermined tolerance.

* * * * *